US009485537B1

(12) United States Patent
Canney et al.

(10) Patent No.: US 9,485,537 B1
(45) Date of Patent: Nov. 1, 2016

(54) ASSET RECOMMENDATIONS IN A VOD SYSTEM WITH ASSET EFFECTIVENESS DETERMINATIONS

(71) Applicant: Canoe Ventures, LLC, Englewood, CO (US)

(72) Inventors: Jason Canney, Highlands Ranch, CO (US); Steve Markel, Highlands Ranch, CO (US); Tim Whitton, Englewood, CO (US); Bob Griese, Parker, CO (US); Julie Samuelson, Englewood, CO (US); Chris Pizzurro, South Salem, NY (US); Mark Shepard, Denver, CO (US); Yong Liu, Englewood, CO (US)

(73) Assignee: Canoe Ventures, LLC, Englewood, CO (US)

( * ) Notice: Subject to any disclaimer, the term of this patent is extended or adjusted under 35 U.S.C. 154(b) by 0 days.

(21) Appl. No.: 14/732,482

(22) Filed: Jun. 5, 2015

(51) Int. Cl.
*H04N 21/466* (2011.01)
*H04N 21/472* (2011.01)

(52) U.S. Cl.
CPC .... *H04N 21/4668* (2013.01); *H04N 21/47202* (2013.01)

(58) Field of Classification Search
CPC ................ H04N 21/44222; H04N 21/25891; H04N 21/25883; H04N 21/252; H04N 21/44213; H04N 21/4532; H04N 21/4668; H04N 21/47202; H04N 21/482; H04N 21/6175; G06Q 30/0251; G06Q 30/0241; G06Q 30/0242; G06Q 30/0277; H04H 60/33; H04L 67/22; H04L 67/306
See application file for complete search history.

(56) References Cited

U.S. PATENT DOCUMENTS

| | | |
|---|---|---|
| 6,177,931 B1 | 1/2001 | Alexander et al. |
| 8,365,213 B1 | 1/2013 | Orlowski |
| 8,615,514 B1 | 12/2013 | Fernandes et al. |
| 8,813,124 B2 | 8/2014 | Tidwell et al. |
| 9,247,313 B1 | 1/2016 | Lewis et al. |
| 2002/0129363 A1 | 9/2002 | McGuire |
| 2005/0155056 A1 | 7/2005 | Knee et al. |
| 2007/0088607 A1 | 4/2007 | Feierbach |
| 2007/0226058 A1 | 9/2007 | Lorenzen et al. |
| 2008/0028064 A1 | 1/2008 | Goyal et al. |
| 2008/0046924 A1 | 2/2008 | Hood |
| 2008/0092158 A1 | 4/2008 | Bhatnagar et al. |
| 2008/0104503 A1 | 5/2008 | Beall et al. |
| 2008/0263458 A1 | 10/2008 | Altberg et al. |
| 2008/0282290 A1 | 11/2008 | Malik et al. |

(Continued)

*Primary Examiner* — Hai V Tran
(74) *Attorney, Agent, or Firm* — Duft Bornsen & Fettig LLP; Gregory T. Fettig

(57) ABSTRACT

Systems and methods presented herein provide for asset recommendations based on asset effectiveness determinations. In one embodiment, an asset recommendation system operable to recommend insertion of assets into Video On Demand (VOD) content being selected by users through Customer Premises Equipment (CPEs). The system includes a recommendation engine communicatively coupled to an asset effectiveness evaluation module and to an asset decision system, wherein the recommendation engine is operable to accumulate demographic information associated with the determined effectiveness of the assets, to generate an anonymous user profile based on the accumulated demographic information and the associated effectiveness of the assets, and to recommend assets for insertion to the asset decision system based on the anonymous user profile. The anonymous user profile is used to identify other users with similar demographic information to retrieve and rank the assets for insertion to VOD content selections by the other users.

7 Claims, 8 Drawing Sheets

(56) References Cited

U.S. PATENT DOCUMENTS

| | | | |
|---|---|---|---|
| 2009/0049468 A1* | 2/2009 | Shkedi | H04N 21/812 725/34 |
| 2009/0187939 A1 | 7/2009 | LaJoie | |
| 2009/0204615 A1 | 8/2009 | Samame et al. | |
| 2010/0030744 A1 | 2/2010 | DeShan et al. | |
| 2010/0131969 A1 | 5/2010 | Tidwell et al. | |
| 2010/0138290 A1 | 6/2010 | Zschocke et al. | |
| 2010/0158098 A1 | 6/2010 | McSchooler et al. | |
| 2010/0251305 A1 | 9/2010 | Kimble et al. | |
| 2010/0280876 A1 | 11/2010 | Bowra | |
| 2011/0016482 A1* | 1/2011 | Tidwell | G06Q 30/00 725/14 |
| 2011/0035272 A1* | 2/2011 | Bhatt | G06Q 30/02 705/14.42 |
| 2011/0078726 A1 | 3/2011 | Rosenberg et al. | |
| 2011/0179359 A1 | 7/2011 | Nussel et al. | |
| 2011/0295700 A1 | 12/2011 | Gilbane et al. | |
| 2012/0096489 A1 | 4/2012 | Shkedi | |
| 2012/0124638 A1 | 5/2012 | King et al. | |
| 2012/0240019 A1 | 9/2012 | Nuzzi | |
| 2012/0278830 A1 | 11/2012 | Khoshgozaran et al. | |
| 2013/0042285 A1 | 2/2013 | Downey et al. | |
| 2013/0078916 A1 | 3/2013 | Glickman | |
| 2014/0020017 A1 | 1/2014 | Stern et al. | |
| 2014/0101685 A1 | 4/2014 | Kitts et al. | |
| 2014/0114753 A1 | 4/2014 | Xiao et al. | |
| 2014/0366051 A1 | 12/2014 | Cronk et al. | |
| 2015/0012344 A1 | 1/2015 | Guinn et al. | |
| 2015/0128162 A1* | 5/2015 | Ionescu | H04N 21/2547 725/14 |

\* cited by examiner

ASSET RECOMMENDATIONS IN A VOD SYSTEM WITH ASSET EFFECTIVENESS DETERMINATIONS

CROSS REFERENCE TO RELATED APPLICATIONS

This patent application is related to commonly owned and co-pending patent application Ser. Nos. 13/628,324, 13/628,360, and 13/628,381 (each having a filing date of Sep. 27, 2012), the entire contents of each of which are incorporated by reference. This patent application is also related to commonly owned and co-pending patent application Ser. No. 14/732,462, the entire contents of which are incorporated by reference.

FIELD OF THE INVENTION

The invention relates to the field of Video On Demand (VOD) systems and more specifically to recommending assets for insertion to asset decision systems to improve asset insertion into VOD content selections.

BACKGROUND

Television networks, such as the American Broadcasting Company (ABC), the Columbia Broadcasting Company (CBS), and the National Broadcasting Company (NBC), have for years broadcast television shows to the masses as a means for generating revenue through advertising. For example, these networks produce television shows and then seek out sponsors to advertise on the shows. The television shows, or "content", have designated timeslots in which the sponsors' advertisements, or "assets", are inserted. The content and the inserted assets are then broadcast by the television networks, or "content providers", to the public over federally licensed communication airways, occasionally referred to as linear video distribution.

This "shotgun" approach to advertising proved to be very successful in the beginning. However, as the number of advertisers wishing to sell their goods and services substantially increased, television evolved into a much more complex system of communications. For example, cable television providers and satellite television providers now serve as intermediary "content distributors" between the content providers and the intended public audience. And, the number of content providers has increased accordingly. In this regard, many members of the general public have signed on as customers of the cable/satellite content distributors so as to receive a broader availability of content.

Because the market for content consumption has grown, the number of content distributors has also grown. And, because each of these providers has its own method of content delivery, the manner in which the content and assets are delivered to the customers has become increasingly complex. Generally, the content providers deliver the content to the content distributors with instructions to insert various national assets into the content at certain times. For example, if a company wishes to run a national advertisement campaign targeting a certain television show associated with a particular demographic, the company may purchase one or more timeslots, or "placement opportunities", within that television show from the content provider to air assets advertising the goods and services of the company. The content provider then provides the content to each of the content distributors with directions to insert the assets within the timeslots purchased by the company.

The content distributors may also have certain timeslots available for inserting certain local assets. For example, a content distributor may have "headends" configured in various communities to distribute content to their customers located therein. Each headend receives content from the content providers with various designated timeslots for inserting assets into the content. Some of those timeslots may be designated for local advertisements where companies within the service area of the headend wish to advertise. These companies purchase those timeslots from the content distributor for insertion of their assets to expose the customers to their advertising at the more local level.

As complex as the cable/satellite television has become, certain devices have come along to change and/or circumvent these forms of marketing altogether. The digital recorder, such as that produced by Tivo, is one example of a means for avoiding the asset insertions of marketing strategists. With the digital recorder, the content distributors' customers are able to digitally record entire episodes of content and view that content at their leisure, as opposed to a time established by the content providers. However, these customers can also use the digital recorders to fast-forward or skip through the assets without viewing them, much to the dismay of the asset owners.

In response, content distributors started providing content on a "Video On Demand" (VOD) basis, sometimes referred to as nonlinear video distribution. In VOD, the content provider delivers the content to the content distributor which in turn maintains the content for subsequent and individual distribution to their customers. Thus, a customer may select a desired content through a set-top box (STB) or other device (collectively referred to herein as "customer premise equipment" or "CPE") and watch that content at the customer's leisure. This VOD content is also typically configured with timeslots where assets may be inserted. However, marketing strategists have not been able to determine the effectiveness of asset insertion in VOD content.

SUMMARY

Systems and methods presented herein provide for the insertion of assets into selected VOD content and campaign recommendations for those assets. For example, advertisers have advertisements that they desire being placed in VOD content. Those advertisements are often configured with a campaign that indicates how and when the advertisements are to be placed in the VOD content. However, the advertisers do not know the effectiveness of their campaign strategies. The systems and methods herein provide for improving asset campaigns by evaluating the effectiveness of the assets and providing recommendations to assist the asset providers with their campaigns.

Generally, such entails determining how effective individual assets are in a particular VOD content. For example, VOD content may be selected by a user through a CPE. An engagement detector may analyze upstream internet traffic through a cable television network, identify household identifications (HHIDs) from the upstream internet traffic, and detect an internet website selected by the user from the upstream internet traffic based on the user's HHID. An asset association module communicatively coupled to the engagement detector may detect an asset inserted into the VOD content selected by the CPE, associate the internet website with the inserted asset, determine a period of time between insertion of the asset and the selection of the internet website by the user, and determine an effectiveness of the asset based on the determined period of time.

Based on these determinations, recommendations may be provided to an asset decision system that determines how/when certain assets (e.g., advertisements) should be inserted into various VOD selections. In this regard, a recommendation engine is operable to direct one or more asset decision systems to select assets for insertion into VOD content selections. These asset decision systems, in turn, direct their associated headends to insert the assets into the VOD content selections.

In one exemplary embodiment, an asset recommendation system is operable to recommend insertion of assets into VOD content being selected by users through CPEs. The system includes an asset effectiveness evaluation module communicatively coupled to a VOD system of a cable television headend and to an upstream internet hub. The asset effectiveness evaluation module is operable to analyze upstream internet traffic through a cable television network, to identify internet websites selected by households from the upstream internet traffic in response to the households viewing the assets inserted in the VOD content, to associate the internet websites with the inserted assets, to determine periods of time between the asset insertions and the internet website selections, and to determine effectiveness of the assets based on the determined periods of time. The system also includes a recommendation engine communicatively coupled to the asset effectiveness evaluation module and to an asset decision system. The recommendation engine is operable to accumulate demographic information associated with the determined effectiveness of the assets, to generate an anonymous user profile based on the accumulated demographic information and the associated effectiveness of the assets, and to recommend assets for insertion to the asset decision system based on the anonymous user profile. The asset decision system uses the anonymous user profile to identify other users with similar demographic information to retrieve and rank the assets for insertion to VOD content selections by the other users.

The various embodiments disclosed herein may be implemented in a variety of ways as a matter of design choice. For example, the embodiments may take the form of physical machines, computer hardware, software, firmware, or combinations thereof. In one embodiment, a computer readable medium is operable to store software instructions for directing the asset insertion into content. These software instructions are configured so as to direct a processor or some other processing system to operate in the manner described above.

Other exemplary embodiments are described below.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION OF THE DRAWINGS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below.

Figure 1:
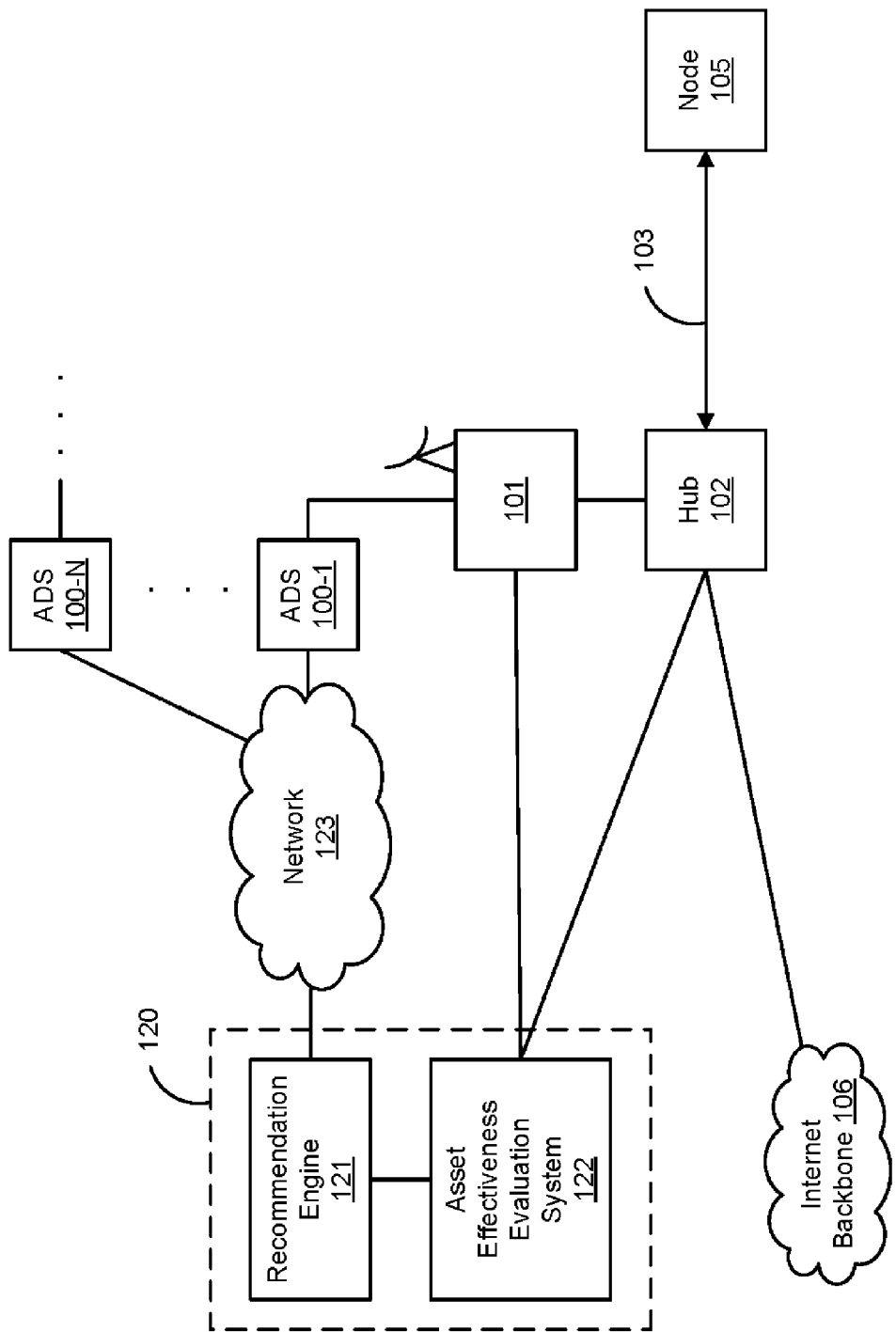
FIG. 1 is a block diagram of an exemplary recommendation system.

FIG. 1 is a block diagram of an exemplary recommendation system 120. The recommendation system 120 includes an asset effectiveness evaluation system (AEES) 122 that is operable to determine the effectiveness of assets inserted in the VOD content at a headend 101 of a communication network. The recommendation system 120 also includes a recommendation engine 121 that is operable to compile information pertaining to the effectiveness of the inserted assets to generate an anonymous user profile that is used to recommend assets to VOD asset decision systems 100-1-100-N.

The communication network may be representative of a cable television network in which a number of subscribers have access to VOD content through the headend 101 of the communication network. The headend 101 inserts the assets into the VOD content oftentimes directed by an asset decision system 100. The asset decision system 100 generally determines which assets would be most effective for VOD content selections on a VOD content selection by content selection basis. The asset decision system 100 then directs the headend 101 to insert the assets into individual content selections for delivery to their respective subscribers through the hub 102 and to the downstream node 105.

The node 105, as illustrated in greater detail below in FIG. 2, transfers the VOD content selections to the individual subscribers with the assets already inserted into the VOD content. The hub 102 and the node 105 are also operable to provide high-speed Internet access to the subscribers through an Internet backbone 106.

The AEES 122 monitors when VOD content is selected by subscribers and when assets are inserted into those selections. The AEES 122 also monitors upstream Internet traffic from the subscribers to determine when they may visit websites associated with the assets inserted into the VOD content selections. For example, when a subscriber coupled to the node 105 selects VOD content with assets already inserted therein as directed by the ADS 100-1, the AEES 122 determines the times the assets were inserted into the VOD content as well as the type of VOD content that was selected (e.g., a genre of a movie or television show). From there, the AEES 122 may determine a particular demographic of the subscriber selecting the VOD content (e.g., age, race, sex, residence location, etc.). After viewing the content and the assets inserted therein, the subscriber may be inclined to interact on the Internet with a website that relates to one of the assets inserted in the VOD content selection. The AEES 122 is operable to detect that website interaction based on a HHID of the subscriber's user equipment (e.g., CPE). As the AEES 122 is able to determine, to some degree, when an asset has been viewed by the subscriber and when that asset subsequently causes the subscriber to interact with the website pertaining to that asset, the AEES 122 may determine how effective that asset was in influencing the subscriber.

The AEES 122 is operable to monitor a number of VOD content selections from a number of subscribers. The AEES 122 collects this information and transfers it to the recommendation engine 121 which, in turn, determines how effective a particular asset was at influencing a particular demographic of subscribers. The recommendation engine 121 then generates an anonymous user profile based on the collected information of the subscribers and generates an anonymous user profile based on that information. For example, as multiple subscribers with a similar demographic may select similar VOD content, they may also be similarly influenced by certain assets inserted into their VOD content selections. The AEES 122 collects this information and transfers it to the recommendation engine 121 which compiles the information into individual demographic profiles.

To illustrate, the recommendation engine 121 may determine that asset-1 is most effective with demographic-1, asset-2 is most effective with demographic-2, etc. The recommendation engine 121 then generates anonymous user profiles based on demographic-1, demographic-2, etc., and transfers those to the ADS 100-1 such that the ADS 100-1 can make determinations on how those assets can be inserted into other VOD content selections by subscribers with similar demographics.

As illustrated in this embodiment, the recommendation system 120 is communicatively coupled to the ADS 100-1 through a network 123. The network 123 is representative of any network operable to transfer data between systems, such as the Internet, cable television networks, private data links and the like. The recommendation system 120 is not intended to be limited to merely presenting the anonymous user profile to a single ADS 100-1. Rather, the recommendation system 120 may be operable to recommend assets for insertion based on anonymous user profiles to a plurality of ADSs 100. For example, each headend 101 may be configured with its own ADS 100. And the recommendation system 120 may be operable to monitor asset insertions, VOD content selections, and upstream Internet content from a plurality of different headends 101. Accordingly, the recommendation system 120 may interact with each of ADS 100 of a number of headends 101. Examples of an ADS 100 are shown and described in the U.S. patent application Ser. Nos. 13/628,324, 13/628,360, and 13/628,381.

Figure 2:
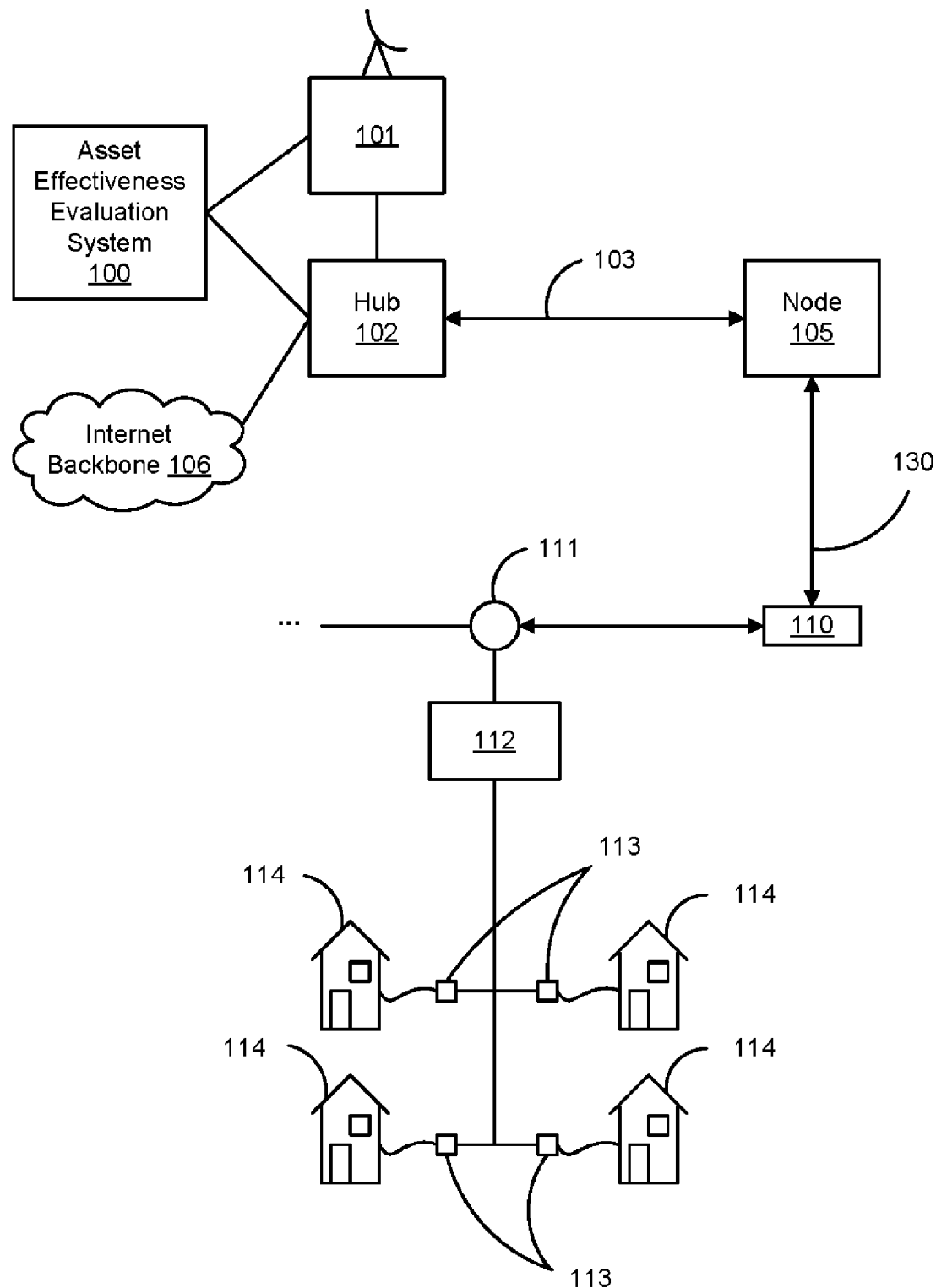
FIG. 2 is a block diagram of an exemplary system for determining effectiveness of asset insertions in VOD content.

FIG. 2 is a more detailed block diagram of the AEES 122 and its operations. The AEES 122, in this exemplary embodiment, is operable in a cable television network employing high speed data services. The cable television network is operable to present VOD content to subscribers (also referred to herein as users and customers). The cable television network is also operable to insert assets (e.g., advertisements) into the VOD content. Such may even include attempts at "targeted advertising" where the assets are chosen and directed towards a particular audience (e.g., based on demographics and the like). The AEES 122 is operable to monitor the assets that are inserted into the VOD content and determine the effectiveness of those assets being viewed by the subscribers. For example, the AEES 122 may determine how likely a particular advertisement inserted into VOD content influenced a particular subscriber towards an owner of the advertisement.

The cable television network includes a headend 101 configured with an upstream hub 102 (e.g., a Cable Modem Termination System, "CMTS") coupled to a downstream node 105. The headend 101 is the source for various television signals. For example, antennas of the headend 101 may receive television signals that are converted as necessary for transmission the hub 102. The hub 102 typically conveys the television signals over digital links to the node 105. Several hubs may be connected to a single headend 101 and the hub 102 may be connected to several nodes 105.

Downstream, in homes/businesses 114 are devices called the cable modems (shown below). A cable modem acts as a host for an Internet Protocol (IP) device such as personal computer. Downstream digital transmissions are continuous and are typically monitored by many cable modems. Upstream transmissions from the cable modems to the hub 102 are typically conveyed over a shared link by the cable modems that are on-line.

After the downstream signal leaves the node 105, the signal is typically carried by a coaxial cable 130. At various stages, a power inserter 110 may be used to power coaxial line equipment, such as amplifiers or other equipment. The signal may be split with a splitter 111 to branch the signal. Further, at various locations, bi-directional amplifiers 112 may boost and even split the signal. Taps 113 along branches provide connections to subscriber's homes 114 and businesses.

Upstream transmissions from subscribers to the hub 102/headend 101 occur by passing through the same coaxial cable 130 as the downstream signals, in the opposite direction on a different frequency band. The hub 102 connects the subscribers to the Internet backbone 106 that allows the subscriber cable modems to exchange Internet traffic. This, however, is just one exemplary embodiment. Other exemplary embodiments are described below.

The AEES 122 is any system, device, software, or combination thereof operable to detect when assets are inserted into a VOD content selections and to process upstream internet traffic to determine the effectiveness of the assets based on times of the inserted assets and subscriber Internet interactions pertaining to those assets. Examples of the AEES 122 include computers, servers, and/or network elements.

In this particular example, it is assumed that the cable television network is operating and that a subscriber has selected a VOD content with assets already inserted. The AEES 122 is operable to detect the assets that are inserted into the VOD content. Then, the AEES 122 processes upstream Internet traffic. The upstream Internet traffic generally comprises Internet traffic from a plurality of households 114 (and/or businesses) that are communicatively coupled to the node 105. The node 105 conveys the upstream Internet traffic to the hub 102 where it is connected to the Internet backbone 106. The AEES 122 is communicatively coupled to the hub 102 to monitor the Internet traffic. In doing so, the AEES 122 is operable to identify HHIDs from the upstream Internet traffic.

With the HHID determined, the AEES 122 detects an Internet site selected by a subscriber from the upstream Internet traffic. For example, the AEES 122 can identify a particular subscriber's Internet traffic based on the HHID the subscriber's equipment that is transmitted along with the upstream Internet traffic. The AEES 122 can monitor that Internet traffic and determine which websites that subscriber's equipment is searching for. The AEES 122 may perform this operation for each subscriber in the upstream Internet traffic.

With the upstream Internet traffic of the subscriber being monitored by the AEES 122 and a priori knowledge of the assets inserted into the VOD content selected by the subscriber, the AEES 122 is operable to associate the Internet websites with the inserted assets. From there, the AEES 122 is operable to determine a period of time between the insertion of the asset and selection of the Internet website and then determine an effectiveness of the asset based on that time. The AEES 122 is also operable to privatize the subscriber's Internet usage so that it is not shared.

Figure 3:
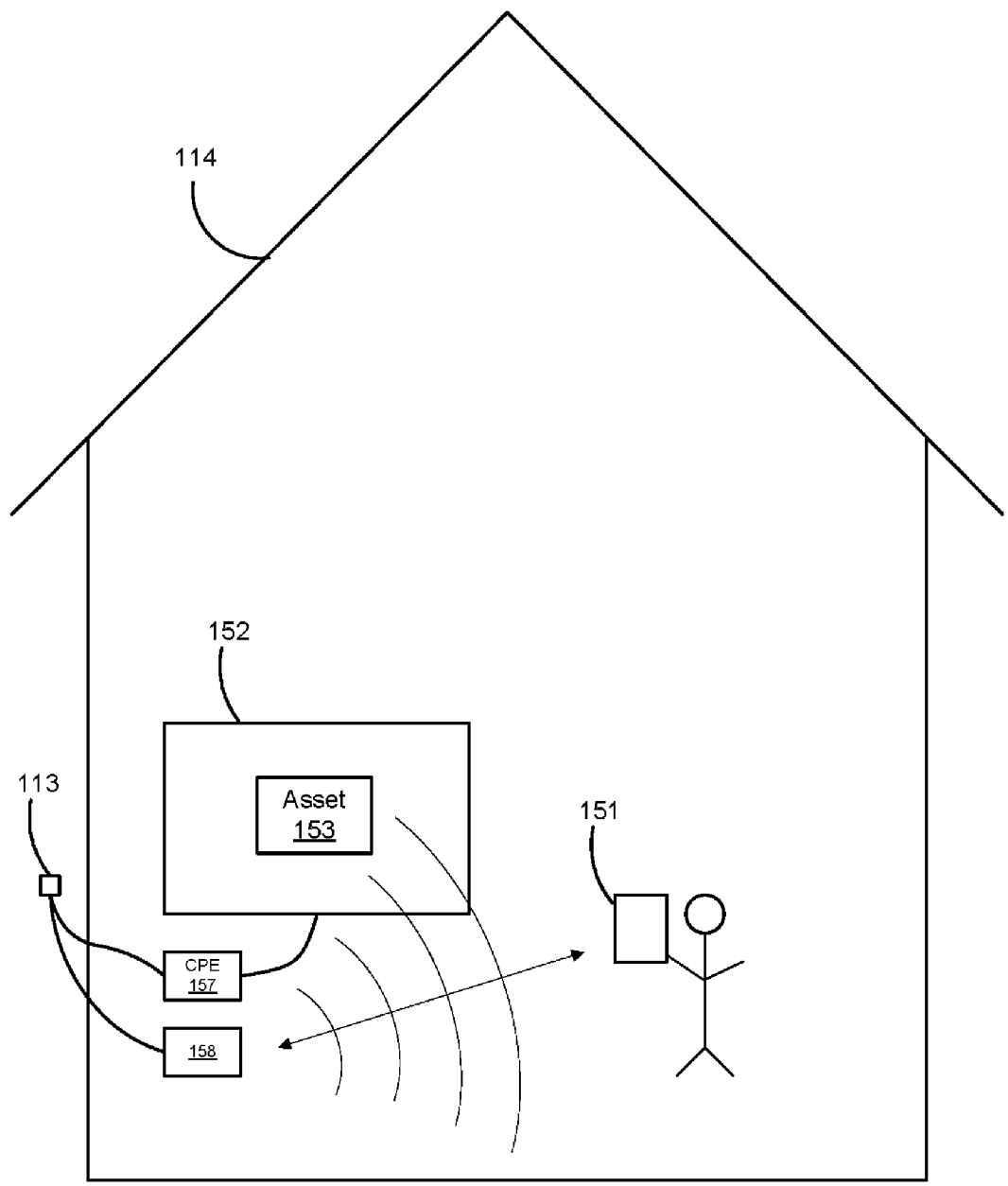
FIG. 3 is a block diagram of an exemplary user environment for accessing VOD content.

In FIG. 3, a block diagram of an exemplary user environment for accessing VOD content is illustrated. In this example, a household 114 includes a monitor 152 (e.g., a television, a computer, etc.) that is operable to display VOD content and the various assets 153 inserted therein. The monitor 152 is communicatively coupled to a CPE 157 that connects to a nearby tap 113. This exemplary environment is also configured with a cable modem 158 that is also coupled to the tap 113 and is operable to link user equipment (UE) 151 to the Internet backbone 106 through the cable television network. Examples of the UE 151 include smart phones, computers, tablet computers, and the like.

As discussed above, the AEES 122 is operable to determine the effectiveness of the asset 153 into the VOD content viewed by subscriber. In doing so, the AEES 122 may determine when the asset 153 is displayed to the subscriber and then determine an amount of time until the subscriber interacts with Internet content associated with the asset 153 through the subscriber's user equipment 151. For example, the asset 153 may be an advertisement for Target department stores that is inserted into the VOD content being viewed by the subscriber. The subscriber, after viewing the asset 153, may be inclined to view the website "target.com" on the subscriber's UE 151. The AEES 122 measures the time between the asset 153 being displayed to the subscriber and the subscriber accessing the website to determine an effectiveness of the asset 153.

The CPE 157 is any device or system capable of providing content to subscribers. For example, a CPE 157 may be a set-top box operable to communicate with a cable television headend or a satellite television network (collectively referred to herein as a cable television network). Additional details pertaining to the asset effectiveness determination are shown and described below. First, an exemplary process 175 of FIG. 3 illustrates some of the operational details associated with the AEES 122.

Figure 4:
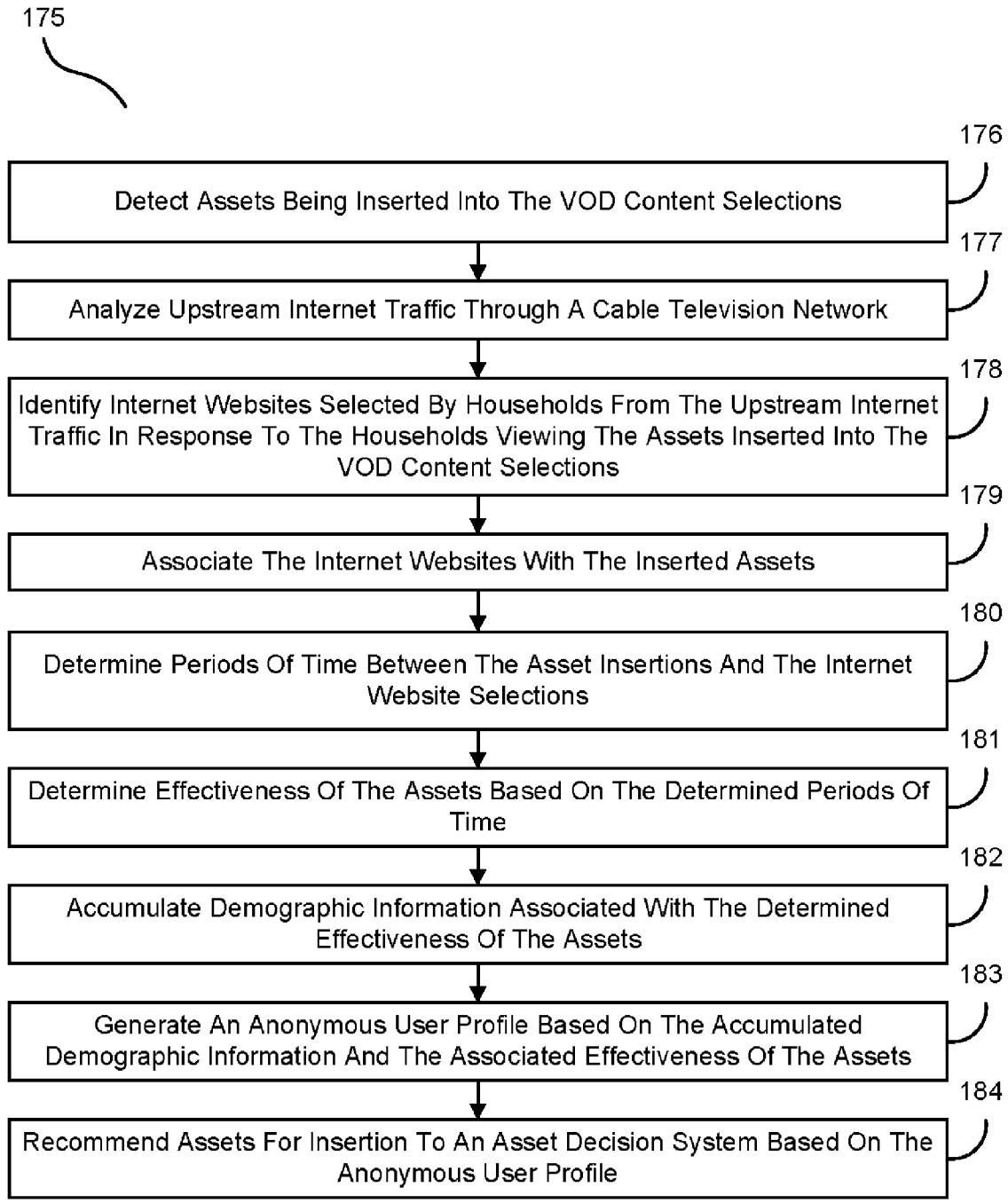
FIG. 4 is a flowchart of an exemplary process for recommending assets for insertion in VOD content.

FIG. 4 is a flowchart of an exemplary process 175 for recommending assets for insertion in VOD content. In this embodiment, the recommendation system 120, through the AEES 122, detects assets being inserted into VOD content selection, in the process element 176. At or about the same time, the AEES 122 analyzes upstream Internet traffic through a cable television network, in the process element 177. The AEES 122, as mentioned, identifies Internet websites selected by households from the upstream Internet traffic in response of the household viewing the assets inserted into their respective VOD content selections, in the process element 178.

The AEES 122 then associates the Internet websites with the inserted assets, in the process element 179. For example, the AEES 122 identifies when an asset is inserted into a VOD content selection by subscriber. The AEES 122 determines whether that subscriber has viewed Internet content relating to that asset. If so, the AEES 122 determines a period of time between the asset insertion and the website selection pertaining to that asset, in the process element 180.

Based on this information, the AEES 122 can determine the effectiveness of the asset upon that subscriber, in the process element 181. For example, a short duration between an asset being inserted into VOD content and a website pertaining to that asset being selected by the subscriber over the Internet generally infers that the asset was highly effective. A longer duration would mean that the asset is less effective upon that particular subscriber.

The recommendation engine 121 accumulates this information and the demographic information associated with the effectiveness of the assets, in the process element 182. In other words, the AEES 122 collects information about individual VOD content selections and the demographics of subscribers viewing those selections. And, with a subset of those subscribers where assets have been deemed highly effective, the AEES 122 transfers that information to the recommendation engine 121 where the recommendation engine 121 can compile anonymous user profiles as described above, in the process element 183. From there, the recommendation engine 121 recommends assets for insertion to various ADSs 100 based on the generated anonymous user profiles, in the process element 184.

This process of determining asset effectiveness (process element 183) can be mathematically modeled. For example, the embodiments herein may employ an "Additive Hazard" attribution model that provides for multi-channel attribution. The Additive Hazard model theorizes that conversion happens because of the cascading effect of multiple channels a user is exposed to. The effect of a particular channel can be described by the strength of the effect of the channel over a period of time with a decay function. The cascading effect is the additive effect of all channels involved.

A minimize-maximize algorithm can be employed in an iterative manner to estimate the effect and decay parameters of channels by using collected channel viewing data and sales data (i.e., data pertaining to actual purchases by users). For example, the asset association module 224 may employ a lower bound function $Q(\theta|\theta^{(t)})$, where $\theta=\{\beta, \omega\}$ and $\beta$ is a strength of impact coefficient of an asset and $\omega$ is a time decaying property of the asset (e.g., the time between the viewing of the asset and the actual interaction with related content on the internet). This lower bound function may be written as:

$$Q(\theta|\theta^{(t)}) = \sum_{x_u=1}\sum_{i} p_i^u \log \frac{\beta_{a_i^u}\omega_{a_i^u} e^{\left(-\omega_{a_i^u}(T_u - t_i^u)\right)}}{p_i^u} - \quad \text{Equation (1)}$$

$$\sum_{i}\beta_{a_i^u}\left(1 - \exp(-\omega_{a_i^u}(T_u - t_i^u))\right), \text{ where}$$

$$p_i^u \begin{cases} \dfrac{\beta_{a_i^u}\omega_{a_i^u}\exp(-\omega_{a_i^u}(T_u - t_i^u))}{\sum_{i=1}^{l_u}\beta_{a_i^u}\omega_{a_i^u}\exp(-\omega_{a_i^u}(T_u - t_i^u))}, & X_u = 1. \\ 0, & X_u = 1 \end{cases} \quad \text{Equation (2)}$$

$p_i^u$ reveals the contribution of advertising channels for the conversion of user u. Specifically, $p_i^u$ represents the contribution of the i-th advertising channel for the conversion user u at time $T_u$ if $X_u=1$.

The following two properties hold for $Q(\theta|\theta^{(t)})$:

$$\mathcal{L}(\theta) \geq Q(\theta|\theta^{(t)}), \forall \theta \qquad \text{Equation (3)}$$

$$\mathcal{L}(\theta^{(t)}) \geq Q(\theta^{(t)}|\theta^{(t)}). \qquad \text{Equation (4)}$$

Let $\theta^{(t+1)} = \max_\theta Q(\theta|\theta^{(t)})$, then $$\mathcal{L}(\theta^{(t+1)}) \geq Q(\theta^{(t+1)}|\theta^{(t)}) \qquad \text{Equation (5)}$$

$$\mathcal{L}(\theta^{(t+1)}) \geq Q(\theta^{(t)}|\theta^{(t)}) = \mathcal{L}(\theta^{(t)}), \qquad \text{Equation (6)}$$

showing that $\mathcal{L}$ increases monotonically during the iterations. It can also be shown that the iterations convert to a local optimal $\mathcal{L}$.

By optimizing $Q(\theta|\theta^{(t)})$, all variables $\beta$ and $\omega$ can be optimized independently with closed form solutions such that the non-negativity constraints are naturally taken care of. Then, optimizing with respect to $\beta_k$ and letting $$\frac{\partial Q}{\partial \beta_k} = 0$$

results in $$\frac{\partial Q}{\partial \beta_k} = \frac{\sum_{u,i,X_u==1,a_i^u==k} p_i^u}{\beta_k} - \sum_{i,a_i^u==k} 1 - e^{-\omega_k^{(t)}(T_u - t_i^u)}. \qquad \text{Equation (7)}$$

And, $\beta_k$ can be updated as follows:

$$\beta_k = \frac{\sum_{u,i,X_u==1,a_i^u==k} p_i^u}{\sum_{i,a_i^u==k} 1 - e^{-\omega_k^{(t)}(T_u - t_i^u)}}. \qquad \text{Equation (8)}$$

Optimizing with respect to $\omega_k$ and letting $$\frac{\partial Q}{\partial \omega_k} = 0$$

results in $$\frac{\partial Q}{\partial \omega_k} = \sum_{u,i,X_u==1,a_i^u==k} p_i^u \left(\frac{1}{\omega_k} - (T_u - t_i^u)\right) - \qquad \text{Equation (9)}$$

$$\sum_{i,a_i^u==k} \beta_k^{(t)}(T_u - t_i^u) e^{-\omega_k^{(t)}(T_u - t_i^u)}.$$

Then, $$\omega_k = \frac{\sum_{u,i,X_u==1,a_i^u==k} p_i^u}{\sum_{u,i,a_i^u==k} p_i^u \left(\frac{1}{\omega_k^u} - (T_u - t_i^u)\right) +} \qquad \text{Equation (10)}$$

$$\beta_k^{(t)}(T_u - t_i^u) e^{-\omega_k^{(t)}(T_u - t_i^u)}$$

After fitting the Additive Hazard model, a conversion probability that a user touches one advertisement channel k is established as the contribution of the channel k. The Additive Hazard models the dynamics of the influences of an advertisement on user conversion by explicitly modeling the strength of influence and its time-decaying property. Thus, in calculating the contributions of any advertisement, a pre-defined observe window T is established. And, the probability of conversion in the time window T can be formulated as:

$$P(C|\beta_k, \omega_k, T) = 1 - \exp(-\beta_k(1 - \exp(-\omega_k T))). \qquad \text{Equation (11)}$$

To summarize, the estimation process utilizes the above formulas to calculate the values of the parameters. To start the estimation process, the asset association module 224 draws β from a uniform distribution unif(0,1) and ω from a uniform distribution unif(1,10). Then, as part of a data generation step, the asset association module 224 establishes the time window to 10. Impression data from the engagement detector 223 is input to cluster nodes and evenly/randomly distributed. The asset association module 224 then calculates a set of values $V_m$ and combines the values to calculate the β and ω values. This process iterates until the parameters β and ω converge. The attribution of a channel is then calculated by taking the conversion C and the probability P that a user touches a single advertisement channel k, during a pre-defined observation window T, using the effect ($\omega_k$) and decay ($\beta_k$) parameters of the channel, as illustrated in Equation (11).

Figure 5:
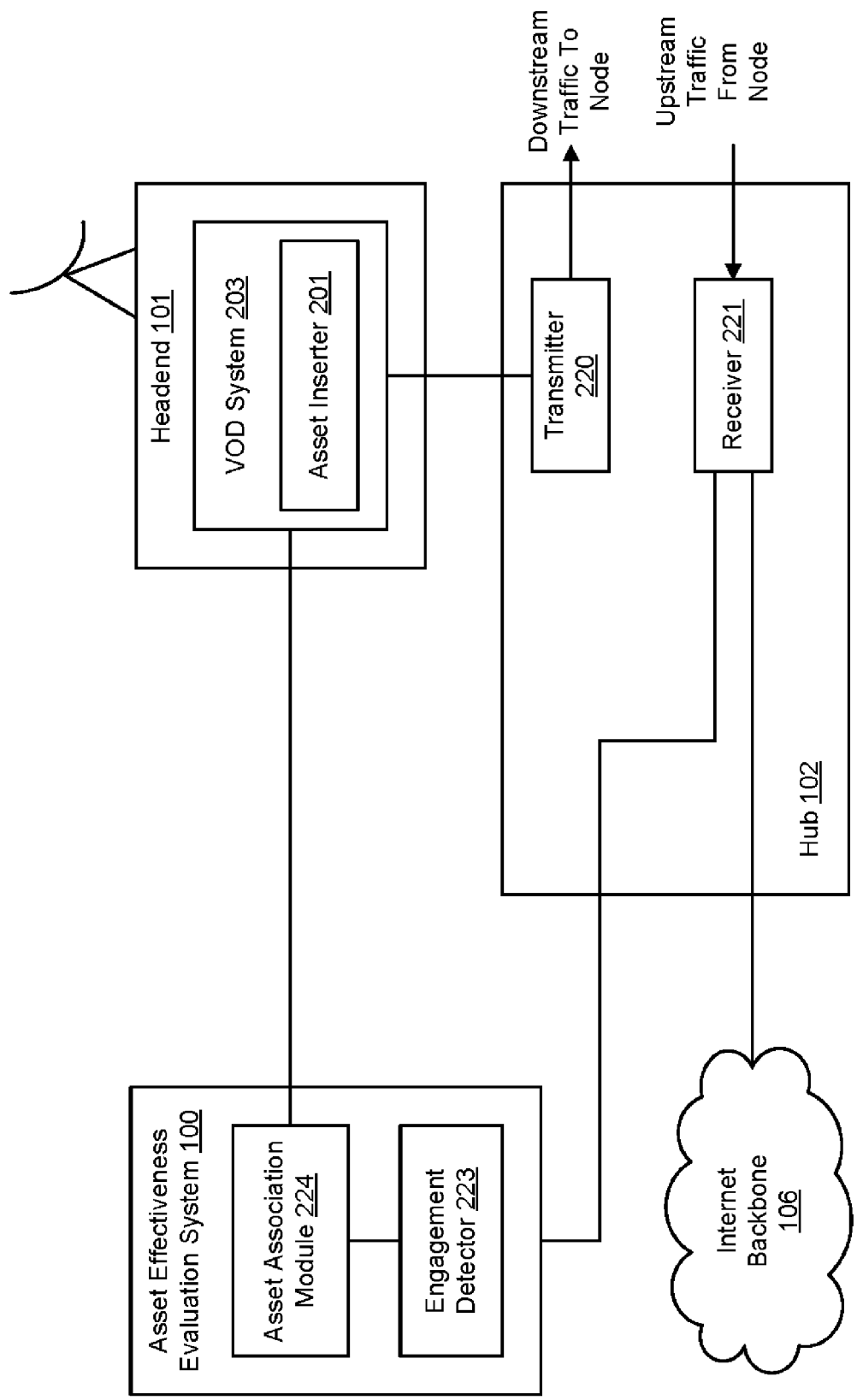
FIG. 5 is a block diagram of an exemplary system for determining effectiveness of asset insertions in VOD content.

In FIG. 5, an exemplary embodiment of the AEES 122 is illustrated in FIG. 2 interacting with a VOD system 203 of a cable television network. In this embodiment, the AEES 122 comprises an asset association module 224 and an engagement detector 223. The asset association module 224 is communicatively coupled to the VOD system 203 of the headend 101. The VOD system 203 is any combination of device, system, and software operable to deliver VOD content to subscribers via a hub 102. The VOD system 203 comprises an asset server 201 that is operable to select assets for insertion into the VOD content selected by the subscribers. When the assets are inserted into the VOD content, the VOD system 203 transfers that VOD content to the transmitter 220 for delivery to a particular subscriber requesting the VOD content (i.e., via downstream traffic to a node 105).

The asset association module 224 is operable to detect times when VOD content and assets are delivered to the subscribers on a subscriber by subscriber basis. For example, the VOD content delivered by the VOD system 203 may have designated timeslots or "placement opportunities" (described in greater detail below) that are used for to insert assets for delivery to a subscriber viewing the VOD content. When the content is delivered to the subscriber, times associated with starting, stopping, and pausing the VOD content as well as the asset insertion times of that VOD content may be detected by the asset association module 224.

The asset association module 224 is also operable to determine a relative effectiveness of assets inserted into the VOD content by the asset inserter 201. For example, based on a time when an actual asset is viewed by the subscriber in the VOD content and a time it takes for the subscriber to interact with Internet content pertaining to that asset, the asset association module 224 can estimate how effective an asset was. A short duration between the time in which the asset is viewed by the subscriber and the time that the subscriber interacts with Internet content pertaining to that asset generally indicates a highly effective asset. A longer duration generally indicates a less effective asset.

The engagement detector 223 is communicatively coupled to the receiver 221 of the hub 102 to detect Internet interactions of subscribers. For example, as the asset association module 224 detects times of the content and assets therein being observed by a particular subscriber, the engagement detector 223 monitors Internet traffic from subscribers in the upstream traffic from the node. The engagement detector 223 may be operable to identify the subscribers based on their household IDs associated with their CPEs 157. Thus, the engagement detector 223 can determine when the particular subscriber interacts with Internet contact related to the assets in the VOD content selected by the subscriber.

To illustrate, a subscriber of the cable television network may select a particular VOD content available on that network through the VOD system 203. The VOD system 203, based on information about the subscriber (e.g., demographics, location, VOD content selection, etc.) may direct certain assets to be inserted into that VOD content selection. In this example, one of those assets may be an advertisement related to Ford trucks. The asset association module 224 determines when that Ford truck advertisement is observed by the subscriber. Then, if the subscriber goes to the Ford website on user equipment 151 as illustrated in FIG. 3, the engagement detector 223 determines the time in which the subscriber observed the Ford website on that user equipment 101. From there, the asset association module 224 determines how effective that Ford truck advertisement was based on, among other things, those times.

Figure 6:
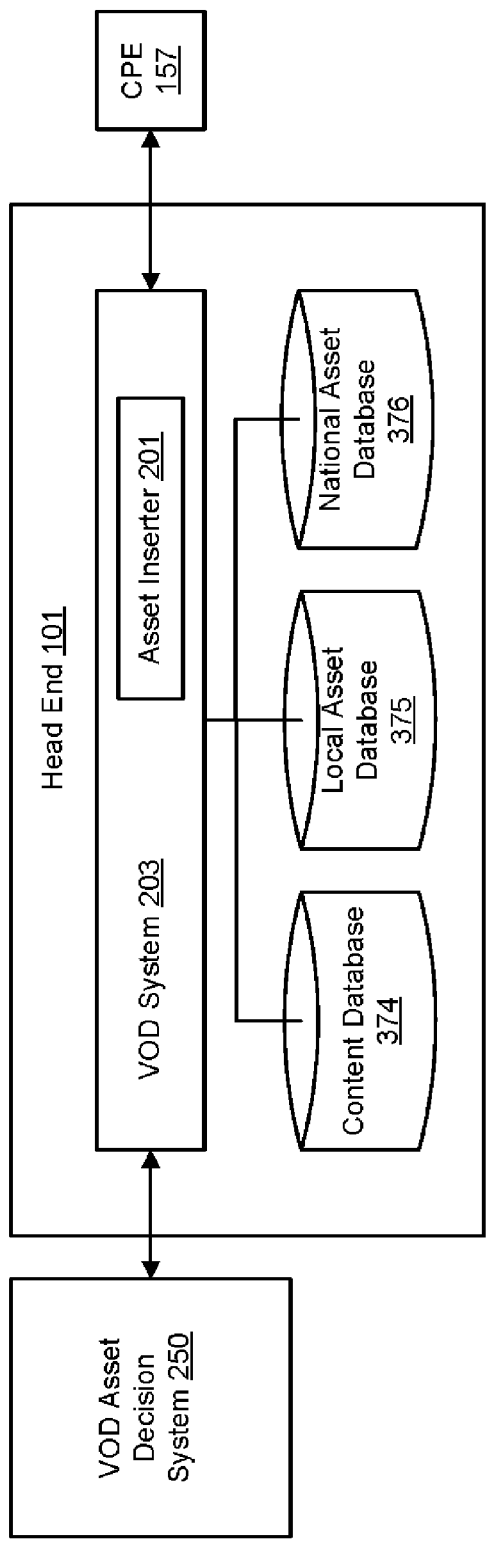
FIG. 6 is a block diagram of an exemplary asset inserter operable with a VOD system.

FIG. 6 is a block diagram of an exemplary VOD asset decision system 250 operable with a VOD system 203 (also known as a "VOD back office system") of a headend 101. The headend 101, in this embodiment, is generally any system operable to receive content for processing and distribution to a CPE 157 (e.g., over a cable television infrastructure or from satellite). For example, the headend 101 may receive content from content providers over television signals for distribution to the customers of a cable content distributor via the customer premise equipment (CPE) 157, such as a set-top box (STB), a gaming console, a smart phone, an electronic tablet, a computer, or the like.

The VOD system 203 of the headend 101 provides the VOD content to the CPE 157 when desired by the customer. For example, the headend 101 may receive the content from the content providers and maintain that content within a content database 374. The headend 101 may also maintain local assets in a local asset database 375 and national assets in a national asset database 376. When a particular content is selected by the user of the CPE 157, an asset inserter 201 of the VOD 203 accesses the content database 374 to retrieve the selected content and deliver that content to the CPE 157. The VOD 203 is any system or device that is operable to deliver video content to the CPE 157 when directed by the CPE 157. The databases 374, 375, and 376 are any systems or devices operable to store and maintain data, audio, and/or video for subsequent distribution to the CPE 157. For example, the databases 374, 375, and 376 may be operable within a computer system that stores the video and audio (e.g., MPEG) content and assets such that they may be accessed by the VOD 203 and delivered to the CPE 157 when desired by the user of such.

Figure 7:
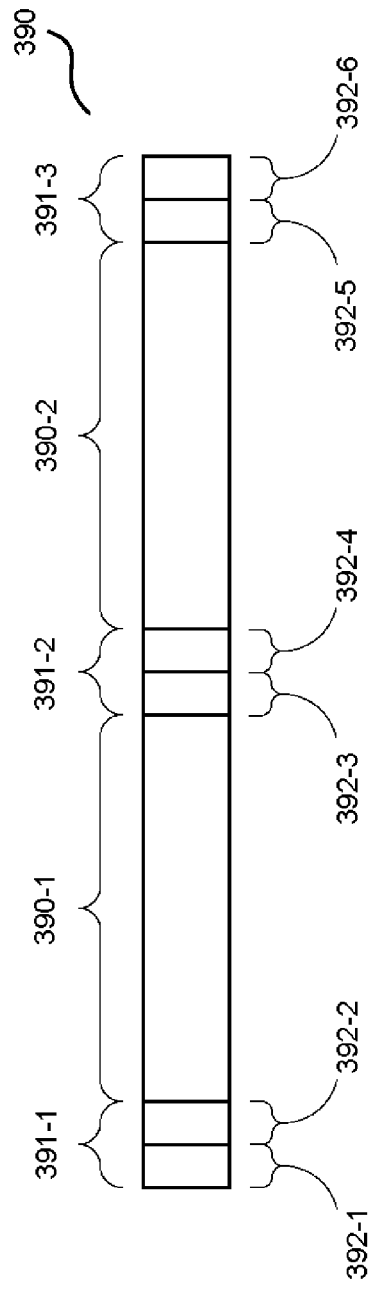
FIG. 7 is a block diagram of an exemplary timing diagram of a VOD content selection with asset placement opportunities.

To illustrate the insertion of assets into content, FIG. 7 shows an exemplary timing diagram of content 390 interlaced with asset timeslots 391, also known as "break positions". When the VOD 203 receives a message from the CPE 157 for the content 390, the VOD 203 retrieves the content 390 from the content database 374. The content 390, in this embodiment, is divided into two segments 390-1 and 390-2 with timeslots 391 disposed at the front end of the content 390-1 (i.e., timeslot 391-1 at the pre roll position), in between the content segments 390-1 and 390-2 (i.e., timeslot 391-2 at the mid roll position), and at the end of the content segment 390-2 (i.e., timeslot 391-3 at the post roll position). Each timeslot 391 is divided into two asset placement timeslots 392 (i.e., asset placement opportunities), each of which is capable of accepting an asset that is typically, but not always, 30 seconds in duration. Thus, a placement opportunity is generally a subset of time of a particular timeslot 391. The VOD asset decision system 250 directs the VOD 203 to insert the assets according to a particular ranking that provides value for the content provider (e.g., monetary value, enhanced relationships with asset providers, etc.). In this regard, the VOD asset decision system 250 may direct the VOD 203 to select assets from the national asset database 106 and/or the local asset database 375 for insertion into the asset timeslots 392-1-392-6 based on the ranking provided by the VOD asset decision system 250.

Also, the invention is not intended be limited to any particular number of content segments 390 or any particular number of asset timeslots. In fact, an asset timeslot 392 may be subdivided for insertion of multiple assets. For example, television commercials are typically 30 seconds in length. Occasionally, however, asset providers reduce the material of certain assets to reduce the overall duration of a particular asset (e.g., by removing material from a 30 second commercial to reduce it to a 15 second commercial). Accordingly, a 30 second asset timeslot 392 may be configured to accept insertions of two 15 second assets. For example, in FIG. 7, the content 390 may be configured with the mid roll timeslot 391-2 having two 30 second asset timeslots 392-3 and 392-4. The asset timeslot 392-3 can thus be further divided into two 15 second asset timeslots 392-3-1 and 392-3-2, allowing for the insertion of two 15 second assets into the asset timeslot 392-3. Still, the invention is not intended to be limited to any particular asset duration, asset timeslot 392 duration, or timeslot 391 duration as such may be configured to meet certain business and/or technical needs.

It should be noted that the decisions regarding the direction of asset insertions occur quite rapidly. For example, the VOD asset decision system 250 may be operable to make asset insertion decisions for a plurality of headends 101. And, each headend 101 may be operable to provide VOD content to a plurality of CPEs 157 at any given time, possibly thousands or more. Thus, when a VOD content selection is made by a particular CPE 157, the VOD asset decision system 250 responds in substantially real time to ensure that the VOD 203 has ample time to retrieve and insert the assets while processing the content selected by the CPE 157.

Figure 8:
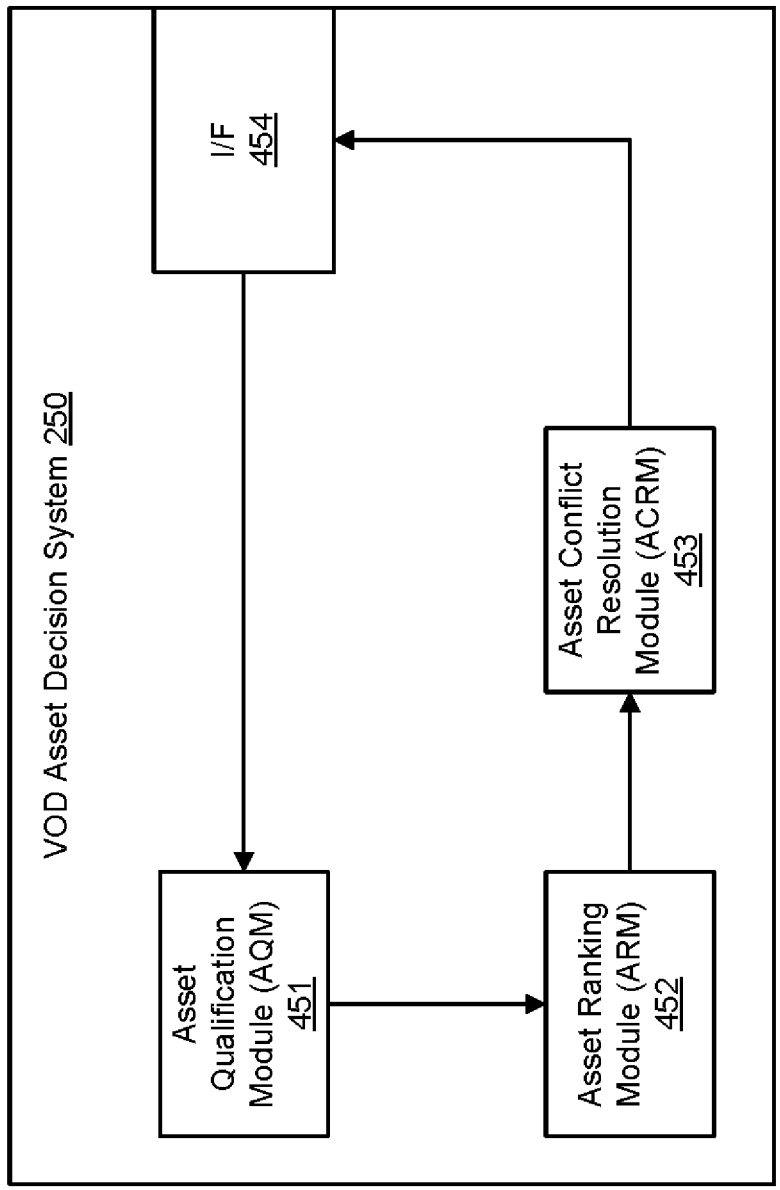
FIG. 8 is a block diagram of an exemplary VOD asset decision system.

FIG. 8 is a block diagram of an exemplary VOD asset decision system 250. In this embodiment, the VOD asset decision system 250 includes an interface 454, an asset qualification module (AQM) 451, an asset ranking module (ARM) 452, and an asset conflict resolution module (ACRM) 453. The interface 454 is any device or system operable to receive information pertaining to a content selection by a CPE 157 such that the VOD asset decision system 250 may direct asset insertion into the selected content. In this regard, the interface 454 may also be operable to transfer information to the VOD 203 to direct the VOD system 203 to insert certain assets from the national asset database 376 and/or the local asset database 375.

The AQM 451 is any device or system operable to communicate with the interface 454 to initially qualify assets for insertion within the content. The AQM 451 may exclude certain assets from insertion into the content selected by the CPE 157. The ARM 452 is any device or system operable to rank the remaining assets (i.e., those not already excluded by the AQM 451) for insertion to the content 390. The ACRM 453 is any device or system operable to remove any ranked assets from insertion into the content 390 based on conflicts between assets. For example, the ACRM 453 may determine that assets from certain advertisers conflict with one another (e.g., Coke and Pepsi). Accordingly, the ACRM 453 may be operable to prevent assets from these advertisers from being inserted within a same timeslot 391 or even within a same content 390. The exemplary operations of the AQM 451, the ARM 452, and the ACRM 453 are explained in greater detail below.

The VOD asset decision system 250 is any system, device, software, or combination thereof operable to interface with a plurality of asset providers to process information about assets (e.g., advertisements, marketing materials, etc.) of the asset providers such that the VOD asset decision system 250 can direct a content distributor to insert assets from the asset providers into VOD content selected by a CPE 157. For example, the content distributor may have access to content from a plurality of content providers (described in greater detail below) that the content distributor provides to its customers via their respective CPEs 157. In this regard, the content distributor may include a VOD system 203 that retrieves stored content for presentation to a CPE 157 when selected by a user of the CPE 157. The content distributor may also have access to assets that are to be inserted into asset placement timeslots (i.e., asset placement opportunities) within the content. The VOD asset decision system 250, being operable to provide value to the content providers, coordinates with campaigns of the asset providers to extract value for the content providers. In this regard, the VOD asset decision system 250 may rank the assets of the asset providers in a manner that provides the most value to the content providers.

CPEs 157 are any devices or systems capable of providing content to users. For example, a CPE 157 may be a set-top box operable to communicate with a cable television headend. Alternatively, a CPE 157 can be a computer or a mobile computing device capable of displaying video from a network (e.g., via streaming video over the Internet). For example, a CPE 157 may select a desired content from an Internet website hosted with an internet server (i.e., the content distributor and VOD system 203) through the network. Once selected, the VOD 203 may retrieve the content from a content database for Internet delivery to the selecting CPE 157. The VOD asset decision system 250, being communicatively coupled to the VOD 203, processes information pertaining to the content selection and selects assets for insertion into that content from a national asset database and/or a local asset database, as illustrated in FIG. 6. To provide more context to the operations of the VOD asset decision system 250, the following example is provided.

In this example, a CPE 157 selects a particular episode of the television show "30 Rock" at 8 pm on a Thursday night from a menu of VOD content that is presented by the VOD 203. The VOD 203 retrieves that episode of 30 Rock from the content database 374. The VOD 203 then retrieves certain assets from the national asset database 376 for insertion into the timeslots of that show. As with many other 30 minute situational comedies, this episode of 30 Rock includes two content sections 390-1 and 390-2 and the three timeslots 391-1, 391-2, and 391-3, as illustrated in FIG. 7. Using this example, the VOD 203 transfers an asset insertion request to the AQM 451 to insert assets into these three timeslots. The AQM 451 then determines that there are a total of six 30 second asset placement opportunities within three timeslots 391-1-3 of the selected content 390. The AQM 451 then processes the active campaigns to determine their eligibility within those six 30 second asset placement opportunities. Among the active campaigns in this example are:

1. A Coca-Cola campaign with a total of four assets and 3 campaign items directing placement opportunities of those assets as follows:
   a) Asset 1 for 100 views anytime;
   b) Asset 2 for any viewing opportunities Monday through Friday between the hours of 5 pm and 10 pm; and
   c) Assets 3 and 4 for any viewing opportunities Friday and Saturday between the hours of 5 pm and 10 pm.

2. A Pepsi-Cola campaign with a total of five assets and four campaign items directing placement opportunities of those assets as follows:
   a) Asset 1 for 20 views anytime;
   b) Asset 2 for 100 views anytime;
   c) Asset 3 for 1000 views anytime;
   d) Asset 4 for any viewing opportunities Monday through Friday between the hours of 5 pm and 10 pm; and
   e) Asset 5 for any viewing opportunities Friday and Saturday between the hours of 5 pm and 10 pm.

3. A Capital One credit card campaign with a total of four assets and three campaign items directing placement opportunities of those assets as follows:
   a) Asset 1 for 100 views anytime;
   b) Asset 2 for 1000 views anytime; and
   c) Assets 3 and 4 for any viewing opportunities Monday through Friday between the hours of 5 pm and 10 pm.

4. A Chrysler Motors campaign with a total of three assets and two campaign items directing placement opportunities of those assets as follows:
   a) Asset 1 for 100 views; and
   b) Assets 2 and 3 for any viewing opportunities Monday through Friday between the hours of 5 pm and 10 pm.

5. A Nickelodeon campaign with one asset and one campaign item directing placement opportunities of that asset as follows:
   a) Asset 1 for 100 views.

Since the television show 30 Rock has a mature theme and since the Nickelodeon campaign is directed towards a younger audience, that campaign item is automatically excluded from the eligible campaign list by the AQM 451. Other remaining campaign items are excluded based on time and date (i.e., campaign items 1c and 2e).

Thus the remaining campaigns of 1a-1b, 2a-2d, 3a-c, 4a-4b are transferred to the ARM 452 for ranking Based on various factors explained in greater detail below, the ARM 452 ranks the campaigns as follows:
   1. Campaign Item 2a
   2. Campaign Item 1a
   3. Campaign Item 3c 4. Campaign Item 2b
5. Campaign Item 4b
6. Campaign Item 4a
7. Campaign Item 1b
8. Campaign Item 1d
9. Campaign Item 2c
10. Campaign Item 1c
11. Campaign Item 2d
12. Campaign Item 3a
13. Campaign Item 3b The ARM 452 transfers this ranked list of campaign items to the ACRM 453 to determine conflicts within the ranked list of campaign items. Typically, the six available asset placement opportunities 392-1-6 within the content 390 would be filled by the first six campaign items based on a rank determined by the ARM 452. However, since some conflicts may exist between campaigns within a particular content and/or timeslot, certain campaigns may be excluded from the placement opportunities 392 such that the ranking is reordered. For example, certain criteria may dictate that a Pepsi Cola asset may not be placed within the same content as a Coca-Cola asset. In this regard, the campaign items 1a-1d are removed from the ranked list because the Pepsi-Cola asset has the higher initial ranking, leaving the following campaign items:

1. Campaign Item 2a
2. Campaign Item 3c
3. Campaign Item 2b
4. Campaign Item 4b
5. Campaign Item 4a
6. Campaign Item 2c
7. Campaign Item 2d
8. Campaign Item 3a
9. Campaign Item 3b With this computed, the ACRM 453 may remove the final three campaign items 7, 8, and 9 from the list as the six placement opportunities can be filled with assets. The ACRM 453 then transfers this information regarding asset placement to the VOD 203. This general embodiment of the messaging may be implemented in any of the above VOD asset decision system embodiments for use in directing the insertion of assets within the content. Other more specific embodiments are shown below.

Once all of the campaign items at each campaign have been evaluated and no campaigns remain or once all of the placement opportunities have been filled, the ACRM 453 directs the VOD 203 to retrieve the assets based on the list generated. For example, the list may be included in a report message that is transferred to the VOD 203 to direct the VOD 203 to insert the assets into the content selected by the CPE 157. It is possible that all of the assets have been excluded during the processes described herein. Thus, the ACRM 453 may then direct the VOD 203 to not place any assets in the content selected by the CPE 457.

The ACRM 453 may even direct the VOD 203 to place assets from the local database 375 and/or the national database 376 into the selected VOD content as desired. The ACRM 453 may also direct the VOD 203 to place assets relating to content, programming, or even services provided by the content distributor. For example, if no assets remain, standard programming information, such as time and date, pertaining to the selected VOD content may be configured as an asset and placed in the selected VOD content. To further illustrate, when an episode of "Modern Family" is selected by a CPE 157 and no assets remain for insertion into the available time slots of that episode, the ACRM 453 may direct the VOD 203 to present the user of the CPE 157 with the date and time when the next episode of Modern Family can be seen.

Since is also possible that not all of the assets in the list may be placed as there may be more assets than available opportunities, the ACRM 453 may weight the assets prior to placement in the selected VOD content. For example, certain assets may provide greater value to the content provider (e.g., the television network). In this regard, the ACRM 453 may rank the remaining assets in a manner that provides the most monetary compensation to the content provider. Thus, the ACRM 453 may reduce the list of available assets for insertion to the amount of opportunities, or timeslots, in the selected VOD content to provide this value to the content provider. In any case, the ACRM 453 directs the VOD 203 to place the assets in the selected VOD content based on the ranked list. Once placement has been directed, the ACRM 453 generates a placement report and transfers that report to the headend 101 so that the headend 101 can track marketing views (e.g., for later negotiations between content distributors and marketers). For example, when a marketer can know how many views of a particular asset there were in a selected VOD content, the marketer can assign a value to that asset that may be used in negotiating price for additional views of the asset in future selected VOD content.

Figure 9:
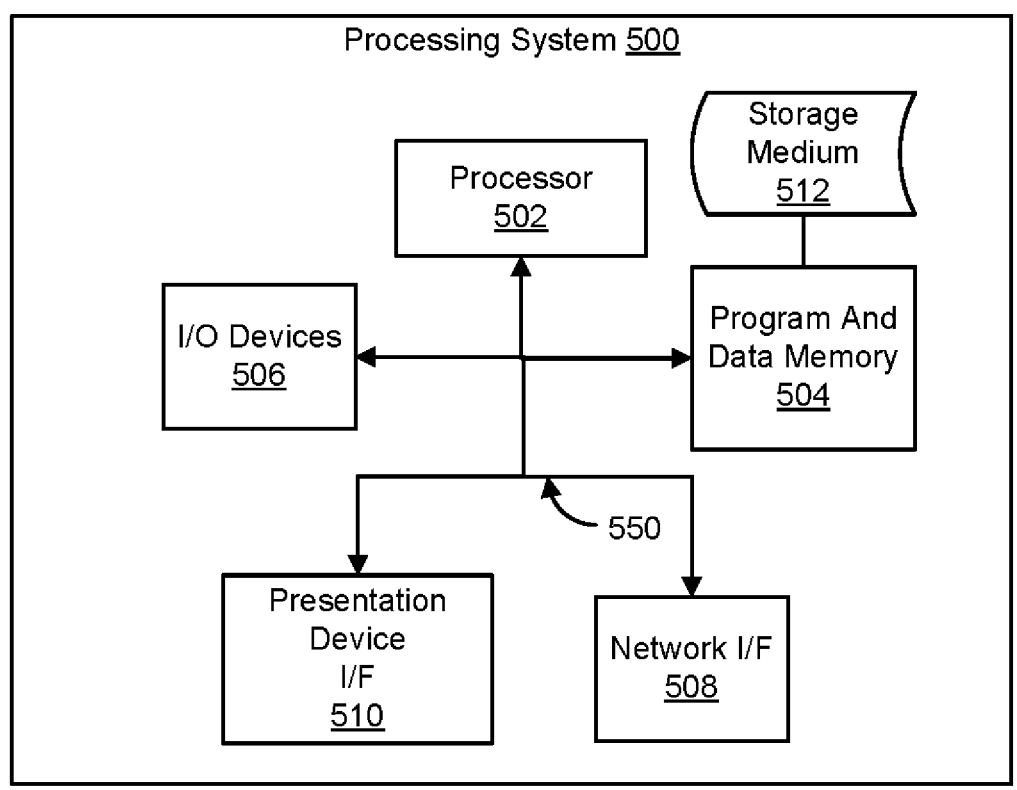
FIG. 9 is a block diagram of an exemplary processing system operable to determine effectiveness of asset insertions in VOD content and to recommend subsequent asset insertions.

FIG. 9 is a block diagram depicting a processing system 500 also operable to provide the above features by executing programmed instructions and accessing data stored on a computer readable storage medium 512. In this regard, embodiments of the invention can take the form of a computer program accessible via the computer-readable medium 512 providing program code for use by a computer or any other instruction execution system. For the purposes of this description, computer readable storage medium 512 can be anything that can contain, store, communicate, or transport the program for use by a computer.

The computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

The processing system 500, being suitable for storing and/or executing the program code, includes at least one processor 502 coupled to memory elements 504 through a system bus 550. Memory elements 504 can include local memory employed during actual execution of the program code, bulk storage, and cache memories that provide temporary storage of at least some program code and/or data in order to reduce the number of times the code and/or data are retrieved from bulk storage during execution.

Input/output (I/O) devices 506 (including but not limited to keyboards, displays, pointing devices, etc.) can be coupled to the processing system 500 either directly or through intervening I/O controllers. Network adapter interfaces 508 may also be coupled to the system to enable the processing system 500 to become coupled to other processing systems or storage devices through intervening private or public networks. Modems, cable modems, IBM Channel attachments, SCSI, Fibre Channel, and Ethernet cards are just a few of the currently available types of network or host interface adapters. Presentation device interface 510 may be coupled to the system to interface to one or more presentation devices, such as printing systems and displays for presentation of presentation data generated by the processor 502.

While the invention has been illustrated and described in detail in the drawings and foregoing description, such illustration and description is to be considered as exemplary and not restrictive in character. Certain embodiments described hereinabove may be combinable with other described embodiments and/or arranged in other ways. Accordingly, it should be understood that only the preferred embodiment and variants thereof have been shown and described and that all changes and modifications that come within the spirit of the invention are desired to be protected.

Additionally, although the term "headend" generally suggests the distribution center or office of a cable television operator or MSO, the term is not intended to be so limited. The term headend as used herein is any system operable to deliver content to a viewer (e.g., a customer or user of the CPE). For example, the term headend may encompass satellite content providers that offer VOD content and/or Internet services to its subscribers. That content is typically delivered directly to the subscriber's antenna for demodulation and decryption by the subscriber's CPE 157. Internet traffic in such a system may be conveyed by satellite and/or other delivery mechanisms (e.g., digital subscriber lines, or "DSL", delivered through subscriber phone lines).

A headend may also refer to a telecom provider that distributes content to mobile phones and other devices. Also, the term "asset", as used herein, includes any type of media for which an owner desires promotion. Examples of such include traditional television commercials, advertisements, streaming video commercials, promotional materials, marketing information, and the like. The term "content", as used herein, is any type of media, such as audio and/or video, in which assets may be inserted. For example, the content operable within the VOD delivery systems described herein may be streamed Internet audio/video, analog cable television feeds, digital cable television feeds, digital satellite television feeds, or digital satellite radio feeds. Thus, the content of the VOD described herein is intended to encompass Video on Demand (VOD) and pay-per-view (PPV) delivered by both modern cable television and satellite television.

What is claimed is:

1. An asset recommendation system operable to recommend insertion of assets into Video On Demand (VOD) content being selected by users through Customer Premises Equipment (CPEs), the system comprising:
    an asset effectiveness evaluation module communicatively coupled to a VOD system of a cable television headend and to an upstream internet hub, wherein the asset effectiveness evaluation module is operable to analyze upstream internet traffic through a cable television network, to identify internet websites selected by households from the upstream internet traffic in response to the households viewing the assets inserted in the VOD content, to associate the internet websites with the inserted assets, to determine periods of time between the asset insertions and the internet website selections, and to determine effectiveness of the assets based on the determined periods of time; and
    a recommendation engine communicatively coupled to the asset effectiveness evaluation module and to an asset decision system, wherein the recommendation engine is operable to accumulate demographic information associated with the determined effectiveness of the assets, to generate an anonymous user profile based on the accumulated demographic information and the associated effectiveness of the assets, and to recommend assets for insertion to the asset decision system based on the anonymous user profile,
    wherein the asset decision system uses the anonymous user profile to identify other users with similar demographic information to retrieve and rank the assets for insertion to VOD content selections by the other users.

2. The asset recommendation system of claim 1, wherein:
    the recommendation engine is further operable to generate the anonymous user profile based on the VOD content.

3. The asset recommendation system of claim 1, wherein:
    the asset effectiveness evaluation module further comprises:
    an engagement detector operable to identify household identifications (HHIDs) from the upstream internet traffic, and to detect a first of the internet websites selected by a user from the upstream internet traffic based on the user's HHID; and
    an asset association module communicatively coupled to the engagement detector and to a VOD asset insertion system of a headend in the cable television network, wherein the asset association module is operable to detect an asset inserted into the VOD content selected by the CPE, to associate the internet website with the inserted asset, to determine a period of time between insertion of the asset and the selection of the internet website by the user, and to determine an effectiveness of the asset based on the determined period of time.

4. The asset recommendation system of claim 1, wherein:
    the asset association module is further operable to direct the VOD asset insertion system to insert the asset into another VOD content selected by the CPE based on the determined effectiveness of the asset.

5. The asset recommendation system of claim 1, further comprising:
    a database comprising demographic information of a plurality of other users having CPEs coupled to the CMTS,
    wherein the asset association module is further operable to determine an identity of the user, to determine demographic information of the user, and to recommend insertion of the asset into VOD selections of a set of the other users having demographic information that is similar to the determined demographic information of the user.

6. A method for recommending insertion of assets into Video On Demand (VOD) content being selected by users through Customer Premises Equipment (CPEs), the method comprising:
    detecting when the assets are inserted into the VOD content selections;
    analyzing upstream internet traffic through a cable television network;
    identifying internet websites selected by households from the upstream internet traffic in response to the households viewing the assets inserted into the VOD content selections;
    associating the internet websites with the inserted assets;
    determining periods of time between the asset insertions and the internet website selections;
    determining effectiveness of the assets based on the determined periods of time;
    accumulating demographic information associated with the determined effectiveness of the assets;

generating an anonymous user profile based on the accumulated demographic information and the associated effectiveness of the assets; and recommending assets for insertion to an asset decision system based on the anonymous user profile, wherein the asset decision system uses the anonymous user profile to identify other users with similar demographic information to retrieve and rank the assets for insertion to VOD content selections by the other users.

7. The method of claim 6, further comprising:

generating the anonymous user profile based on the VOD content.

* * * * *